(12) United States Patent
Liu et al.

(10) Patent No.: US 9,709,244 B2
(45) Date of Patent: Jul. 18, 2017

(54) LIGHT-SOURCE MODULE

(71) Applicants: Hung-Wei Liu, Hsin-Chu (TW);
Chin-Ku Liu, Hsin-Chu (TW)

(72) Inventors: Hung-Wei Liu, Hsin-Chu (TW);
Chin-Ku Liu, Hsin-Chu (TW)

(73) Assignee: Young Lighting Technology Inc.,
Hsin-Chu (TW)

( * ) Notice: Subject to any disclaimer, the term of this patent is extended or adjusted under 35 U.S.C. 154(b) by 435 days.

(21) Appl. No.: 14/335,943

(22) Filed: Jul. 21, 2014

(65) Prior Publication Data
US 2015/0036335 A1    Feb. 5, 2015

(30) Foreign Application Priority Data

Jul. 31, 2013   (CN) .......................... 2013 1 0328389

(51) Int. Cl.
*F21V 8/00*    (2006.01)
*F21V 7/09*    (2006.01)
(Continued)

(52) U.S. Cl.
CPC ............... *F21V 7/09* (2013.01); *F21V 7/005* (2013.01); *G02B 6/0096* (2013.01);
(Continued)

(58) Field of Classification Search
CPC ... F21V 7/09; F21V 7/005; F21V 7/05; F21V 7/009; G02B 6/0096; G02B 6/0046;
(Continued)

(56) References Cited

U.S. PATENT DOCUMENTS

| 2002/0101550 A1 | 8/2002 | Yeh |
| 2007/0171676 A1* | 7/2007 | Chang ................. G02B 6/0046 362/613 |
| 2010/0118530 A1 | 5/2010 | Nagai |

FOREIGN PATENT DOCUMENTS

| CN | 1474214 | 2/2004 |
| CN | 101017281 | 8/2007 |

(Continued)

OTHER PUBLICATIONS

"Office Action of China Counterpart Application" , issued on Oct. 9, 2016, p. 1-p. 8.
(Continued)

*Primary Examiner* — Stephen F Husar
(74) *Attorney, Agent, or Firm* — Jianq Chyun IP Office

(57) ABSTRACT

A light-source module includes an optical film and at least one light-source unit, which together enclose a space. The light-source unit includes a reflective assembly, a light-concentrating unit and at least one light-emitting assembly. The light-concentrating unit has a light exiting end and a light incidence end, and the light exiting end faces the space enclosed by the light-source unit and the optical film. The optical-axis direction of the light-emitting assembly is defined as a first direction, and the direction perpendicular to both the first direction and the optical film is defined as a second direction. The length of the light-concentrating unit in the first direction is defined as a light-concentrating distance, the width of the light exiting end in the second direction is defined as a light exiting width, and the ratio of the light-concentrating distance over the light exiting width is greater than 0.5 but less than 10.

27 Claims, 6 Drawing Sheets

(51) Int. Cl.
*F21V 7/00* (2006.01)
*F21Y 105/00* (2016.01)
*G02F 1/1335* (2006.01)
*F21Y 103/10* (2016.01)
*F21Y 115/10* (2016.01)

(52) U.S. Cl.
CPC ....... *F21Y 2103/10* (2016.08); *F21Y 2105/00* (2013.01); *F21Y 2115/10* (2016.08); *G02B 6/0046* (2013.01); *G02F 1/133615* (2013.01)

(58) Field of Classification Search
CPC .............. F21Y 2115/10; F21Y 2101/00; F21Y 2103/10; F21Y 2105/00; F21Y 2103/20; G02F 1/133615
See application file for complete search history.

(56) References Cited

FOREIGN PATENT DOCUMENTS

| | | |
|---|---|---|
| CN | 101681056 | 3/2010 |
| CN | 102057319 | 5/2011 |
| CN | 102149966 | 8/2011 |
| CN | 102478188 | 5/2012 |
| CN | 202469764 | 10/2012 |
| CN | 102933894 | 2/2013 |
| CN | 103000094 | 3/2013 |
| CN | 103032836 | 4/2013 |
| CN | 103363398 | 10/2013 |
| JP | 2005216693 | 8/2005 |
| TW | 569067 | 1/2004 |
| TW | M263519 | 5/2005 |
| TW | M293182 | 7/2006 |
| TW | 200907229 | 2/2009 |
| TW | 200916690 | 4/2009 |
| TW | I318710 | 12/2009 |
| TW | I332596 | 11/2010 |
| TW | I339294 | 3/2011 |
| TW | 201205001 | 2/2012 |
| TW | I368049 | 7/2012 |
| TW | 201300696 | 1/2013 |
| TW | M444487 | 1/2013 |
| TW | I390303 | 3/2013 |

OTHER PUBLICATIONS

"Office Action of China Counterpart Application", issued on Apr. 7, 2016, p. 1-p. 5.

* cited by examiner

LIGHT-SOURCE MODULE

CROSS-REFERENCE TO RELATED APPLICATION

This application claims the priority benefit of China application serial no. 201310328389.8, filed on Jul. 31, 2013. The entirety of the above-mentioned patent application is hereby incorporated by reference herein and made a part of this specification.

BACKGROUND OF THE INVENTION

Field of the Invention

The invention generally relates to a light-source module, and more particularly, to a light-source module applicable to a display equipment.

Description of Related Art

The light-source module applicable to display equipments are mainly divided into a direct-type light-source module and a side-emission-type light-source module, in which the direct-type light-source module usually includes at least one optical film, a light-guiding plate (LGP), a plurality of light sources disposed under the LGP and a reflector disposed under the light sources. In the direct-type light-source module, however, a sufficient light-mixing distance between the light sources and the LGP and the optical film is required to keep the uniformity of the planar light-source provided by the light-source module, the overall thickness of the direct-type light-source module is hard to be reduced.

Currently, the direct-type light-source module is mainly composed of a plurality of LED (light emitting diode) light sources in association with 2nd lenses, in which the 2nd lenses are configured to reduce the quantity of the employed LEDs or to reduce the overall thickness of the light-source module. In addition, there is one kind of direct-type light-source modules in the current art where only LED light-sources are disposed and which is collectively referred as a fat machine. In comparison with the design scheme employing LEDs in association with 2nd lenses, the fat machine can save the brightness enhancement film (BEF) in the layout, and the LGP can be replaced by a diffuser, but more employed LEDs easily lowers down the system reliability and makes a thicker light-source module. The LEDs in association with 2nd lenses, however, has a disadvantage of higher cost.

Taiwan Patents No. 1339294 and 1390303B1, PRC Patent No. 102933894A and Taiwan Patent No. 1318710 respectively disclose four different light-source modules. Taiwan Patent No. M293182 and Taiwan Patent Applications No. 201300696A1 and 200916690 respectively disclose three light-source devices. Taiwan Patent No. 1368049 discloses a reflective material.

SUMMARY OF THE INVENTION

Accordingly, the invention is directed to a light-source module with a relative thin overall thickness and high light exiting uniformity.

Other objectives and advantages of the invention should be further indicated by the disclosures of the invention, and omitted herein for simplicity.

To achieve one of, a part of or all of the above-mentioned objectives, or to achieve other objectives, an embodiment of the invention provides a light-source module, which includes an optical film and at least one light-source unit. The light-source unit and the optical film together enclose a space; the light-source unit includes a reflective assembly, a light-concentrating unit and at least one light-emitting assembly. The reflective assembly disposed under the optical film, has a first connection end and a second connection end opposite to the first connection end, and in comparison with the first connection end, the second connection end is more close to the optical film. The light-concentrating unit has a light exiting end and a light incidence end opposite to the light exiting end, the light-concentrating unit is adjacent to the first connection end and the optical film, and the light exiting end faces the space. The light-emitting assembly is disposed beside the light incidence end for providing a light-beam to enter the light-concentrating unit via the light incidence end and then enter the space via the light exiting end, in which the optical-axis direction of the light-emitting assembly is defined as a first direction and the direction perpendicular to both the first direction and the optical film is defined as a second direction. The length of the light-concentrating unit in the first direction is defined as a light-concentrating distance, the width of the light exiting end in the second direction is defined as a light exiting width, and the ratio of the light-concentrating distance over the light exiting width is greater than 0.5 but less than 10.

In a light-source module of an embodiment of the invention, the width of the light incidence end in the second direction is defined as a light incidence width, and the light incidence width is less than the light exiting width.

In a light-source module of an embodiment of the invention, the reflective assembly includes a first reflective portion and a second reflective portion, the first reflective portion is disposed between the light-concentrating unit and the second reflective portion, the second reflective portion has a first end and a second end opposite to the first end, the first end is connected to the first reflective portion, the distance between the first end and the optical film in the second direction is defined as a first interval, the distance between the second end and the optical film in the second direction is defined as a second interval, and the second interval is less than the first interval.

In a light-source module of an embodiment of the invention, the first reflective portion is substantially parallel to the optical film.

In a light-source module of an embodiment of the invention, the distance between the first reflective portion and the optical film in the second direction is defined as a third interval, and the ratio of the third interval over the light exiting width is greater than or equal to 1 but less than 10.

In a light-source module of an embodiment of the invention, the reflective assembly has a plurality of consecutive concave-convex structures.

In a light-source module of an embodiment of the invention, the reflective assembly includes a first reflective portion and a second reflective portion, the first reflective portion is disposed between the light-concentrating unit and the second reflective portion, and the concave-convex structures are substantially located at the second reflective portion.

In a light-source module of an embodiment of the invention, each of the concave-convex structures has a convex portion and a concave portion, the drop heights of the convex portion and the concave portion in the second direction range between 0.3 mm and 10 mm, and distance between the convex portion and the concave portion in the first direction ranges between 3 mm and 15 mm.

In a light-source module of an embodiment of the invention, the light-concentrating unit includes an upper reflective portion and a lower reflective portion opposite to the upper reflective portion, and an end of the upper reflective portion is adjacent to the optical film, an end of the lower reflective portion is adjacent to the reflective assembly, and another end of the upper reflective portion and another end of the lower reflective portion are adjacent to the light-emitting assembly.

In a light-source module of an embodiment of the invention, both a first section-line of the upper reflective portion and a second section-line of the lower reflective portion sectioned by a reference plane formed by the first direction and the second direction are aspheric surface curves, and the first section-line and the second section-line are subject to a formula:

$$z = \frac{y^2/R}{1+\sqrt{1-(1+K)y^2/R^2}} + \sum_{n=2}^{10} A_{2n}y^{2n},$$

in which the z direction is the first direction, the y direction is the second direction, K is spherical coefficients, R is curvature radiuses, $A_{2n}$ is the coefficient of $y^{2n}$, n is positive integers larger than or equal to 2 but less than or equal to 10, and R is a non-zero constant.

In a light-source module of an embodiment of the invention, K in the formula is −1 or −10 or between −1 and −10 and when K=−1, A4 is larger than or equal to 0.0001 and less than or equal to 0.1, while when K is −1.1 or −10 or between −1.1 and −10, A4 is larger than or equal to 0.0001 and less than or equal to 0.1.

In a light-source module of an embodiment of the invention, when K in the formula is −1.1 or −10 or between −1.1 and −10, A4 is 0.

In a light-source module of an embodiment of the invention, both the first section-line and the second section-line have the same values of R, K and A4.

In a light-source module of an embodiment of the invention, at least one among the values of R, K and A4 of the first section-line is different from the same of the second section-line.

In a light-source module of an embodiment of the invention, the projection length in the first direction of the upper reflective portion is 1.1-2 times of the projection length in the first direction of the lower reflective portion.

The light-source module of an embodiment of the invention further includes a side reflective unit opposite to the light-concentrating unit for connecting the reflective assembly and the optical film, in which the side reflective unit and the optical film and the light-source unit together enclose the space.

In a light-source module of an embodiment of the invention, the side reflective unit has an included angle towards the optical film, and the angle is less than 180° but greater than 90°.

In a light-source module of an embodiment of the invention, the angle is substantially less than 135° but greater than 90°.

In a light-source module of an embodiment of the invention, the reflective assembly has a protrusion portion protruded towards the space.

In a light-source module of an embodiment of the invention, the protrusion portion has a top-point most close to the optical film, a distance between the top-point and the optical film in the second direction is defined as a fourth interval, and the fourth interval is less than the light exiting width.

In a light-source module of an embodiment of the invention, the ratio of a projection length between the top-point and the first connection end in the first direction over a projection length between the top-point and the second connection end in the first direction is over $\frac{1}{7}$ and less than 7.

In a light-source module of an embodiment of the invention, the optical film includes at least one diffuser.

In a light-source module of an embodiment of the invention, the reflective assembly has a third connection end and a fourth connection end, the fourth connection end is opposite to the third connection end, the third connection end is connected to the first connection end and the second connection end, the fourth connection end is connected to the first connection end and the second connection end, and at least one of the third connection end and the fourth connection end has at least one warping portion curved towards the space.

In a light-source module of an embodiment of the invention, the connection places of the third connection end and the fourth connection ends do not have the warping portion.

In a light-source module of an embodiment of the invention, the number of the light-source units is at least two, the light-source units are arranged adjacently to each other in pairs, in which the second connection end of the at least one light-source unit extends to a place between the optical film and the light-concentrating unit of the other adjacent light-source unit.

In a light-source module of an embodiment of the invention, the reflective assembly of the light-source unit has a plurality of micro structures arranged respectively along the first connection end and the second connection end, the light-emitting assembly comprises a plurality of point light-sources, and gaps between the micro structures are respectively corresponding to at least one point light-source in the first direction.

In a light-source module of an embodiment of the invention, the light-emitting assembly includes a plurality of point light-sources, the point light-sources are disposed along a third direction, and the third direction is substantially parallel to the light incidence end.

It can be seen from the depiction above that in the light-source module of the embodiments of the invention, the light-beam travels in the space enclosed by the light-source units and the optical film, which enables the light-source module providing a uniform planar light-source under the above-mentioned architecture. As a result, the light-source module in the embodiments of the invention does not employ an LGP or 2nd lenses disposed therein, which makes the light-source module thinner and cost less than the prior art. In addition, the design that the ratio of the light-concentrating distance over the light exiting width is less than 10 could reduce the area of an ineffective region at the bottom of the light-source module so as to increase the visual artistic look of the light-source module. By the design that the ratio of the light-concentrating distance over the light exiting width is greater than 0.5, the light-concentrating effect of the light-concentrating unit is enhanced so as to reduce the bright band problem occurring at the position adjacent to the light exiting end.

In order to make the features and advantages of the invention more comprehensible, the invention is further described in detail in the following with reference to the embodiments and the accompanying drawings.

DESCRIPTION OF THE EMBODIMENTS

The relevant technical principles and the features and effects thereof are clearly depicted together with the accompanying drawings in the following depicted embodiments, which are used in examples only, not to limit the disclosure. Note that some of expression words for the relative positions of the parts hereinafter such as 'front', 'behind', 'up', 'down', 'left', 'right', and the like, and the directions of X, Y and Z are to describe and, not to limit, the disclosure.

Figure 1:
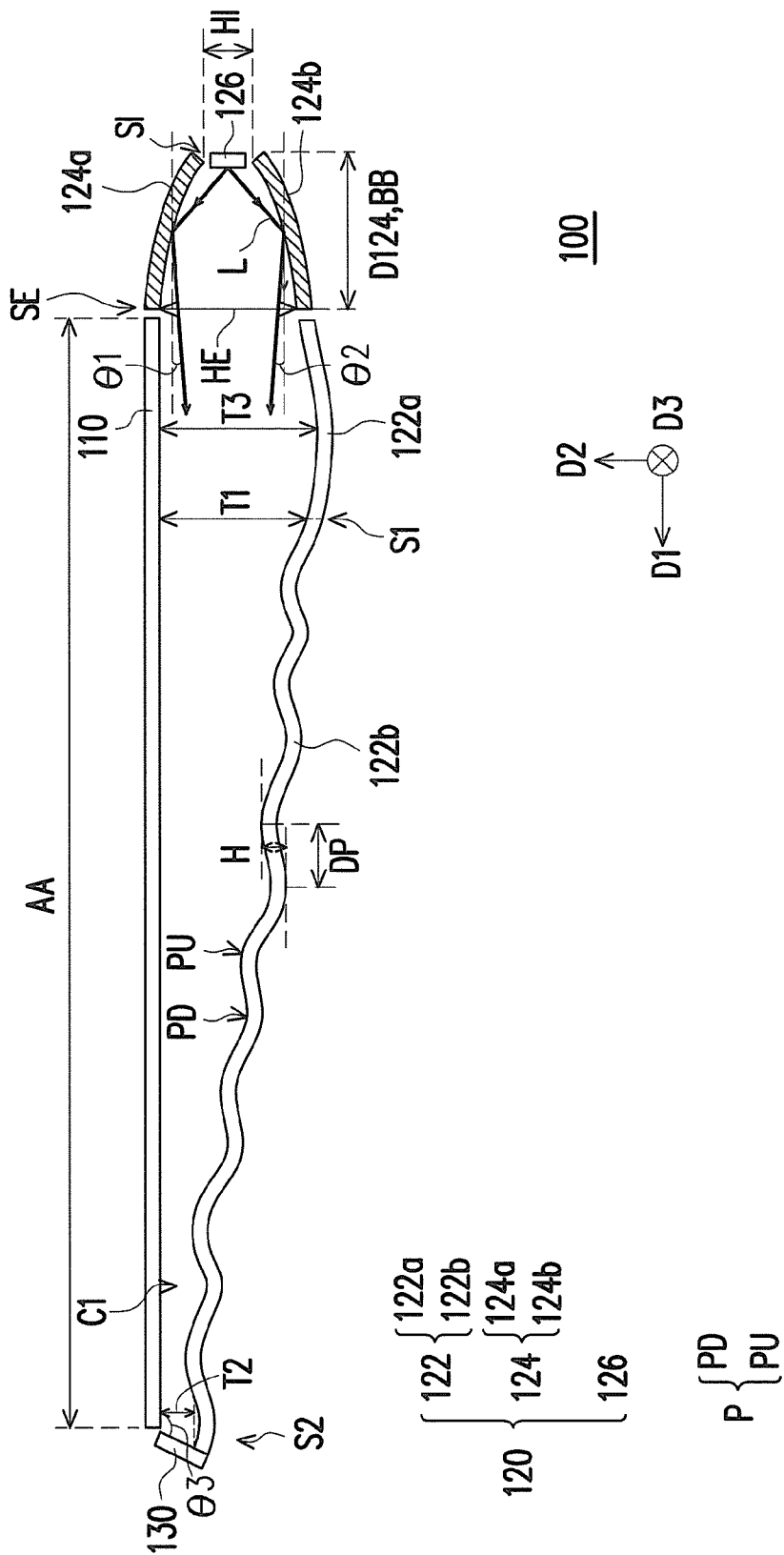
FIG. 1 is a cross-section diagram of a light-source module according to the first embodiment of the invention.

FIG. 1 is a cross-section diagram of a light-source module according to the first embodiment of the invention. Referring to FIG. 1, a light-source module 100 of the embodiment includes an optical film 110 and at least one light-source unit 120, in which the light-source unit 120 includes a reflective assembly 122, a light-concentrating unit 124 and at least one light-emitting assembly 126.

The reflective assembly 122 is disposed under the optical film 110 and the light-concentrating unit 124 is disposed adjacently to the reflective assembly 122 and the optical film 110. The light-concentrating unit 124 has a light exiting end SE and a light incidence end SI opposite to the light exiting end SE, in which the light exiting end SE faces a space C1 enclosed by the optical film 110 and the light-source unit 120. The light-emitting assembly 126 is disposed beside the light incidence end SI of the light-concentrating unit 124, and the light-emitting assembly 126 is configured to emit at least one light-beam L towards the space C1. For depiction convenience later, the optical-axis direction of the light-emitting assembly 126 is defined as a first direction D1 and the direction perpendicular to the first direction D1 and the optical film 110 is defined as a second direction D2. The light-emitting assembly 126 is, for example, a plurality of light emitting diodes (LEDs) which are arranged, for example, in a third direction D3 substantially parallel to the light incidence end SI. In another embodiment, however, the light-emitting assembly 126 could be a cold-cathode fluorescence lamp (CCFL) rather than the LEDs, in which the CCFL extends, for example, in the third direction D3. In addition, when the light-emitting assembly 126 is the LEDs, the first direction D1 is perpendicular to the light-emitting surfaces of the LEDs and when the light-emitting assembly 126 is the CCFL, the first direction D1 is perpendicular to the light-emitting surface of the CCFL and parallel to the optical film 110. In other embodiments, the LEDs or the CCFL could be replaced by other appropriate light-sources, which the invention is not limited to.

In another preferred embodiment, the light-source module 100 could optionally employ a side reflective unit 130 disposed opposite to the light-concentrating unit 124 for connecting the reflective assembly 122 and the optical film 110. In the embodiment, the side reflective unit 130, the optical film 110 and the reflective assembly 122 and the light-concentrating unit 124 of the light-source unit 120 together enclose the space C1. Differently from the prior art where the light beam travels in the LGP of the light-source module, in the light-source module 100 of the embodiment, the light-beam L travels in the space C1 with a transmission medium of air. Therefore, the LGP could be omitted in the light-source module 100 so as to achieve relatively low cost.

In more details, a plane surface of the optical film 110 is the light exiting surface of the light-source module 100. The optical film 110 is, for example, at least one diffuser to make the light-beam L diffused so as to increase the uniformity of the planar light-source provided by the light-source module 100. In other embodiments, the light-source module 100 could have other optical films depending on the actual requirement. For example, the light-source module 100 could further include at least one prism plate (not shown in FIG. 1) disposed on the diffuser so as to reduce the divergence angle of the light-beam L and advance the overall luminance of the light-source module 100.

In the embodiment, the normal projection area of the reflective assembly 122 on the plane where the optical film 110 located on is, for example, greater than or equal to the area of the optical film 110 so as to ensure whole the optical film 110 could receive the light-beam L come from and reflected by the reflective assembly 122. On the other hand, if the surface of the reflective assembly 122 facing the optical film 110 is a diffused reflection surface by design, it is helpful to advance the diffusion of the light-beam L, in which the diffused reflection surface is formed by, for example, adhering a white reflector or injecting white plastic.

In the embodiment, the reflective assembly 122 could be further divided into a first reflective portion 122a and a second reflective portion 122b, in which the first reflective portion 122a is located between the light-concentrating unit 124 and the second reflective portion 122b. The second reflective portion 122b has a first end S1 and a second end S2 opposite to the first end S1, in which the first end S1 is configured to connect the first reflective portion 122a, the distance between the second end S2 and the optical film 110 in the second direction D2 is defined as a second interval T2, the distance between the first end S1 and the optical film 110 in the second direction D2 is defined as a first interval T1, and the second interval T2 is less than the first interval T1. In addition, the distance between the first reflective portion 122a and the optical film 110 in the second direction D2 is defined as a third interval T3. The third interval T3 in the embodiment is the maximal thickness of the space C1.

Although the overall thickness of the light-source module 100 in the embodiment could be reduced by decreasing the third interval T3, but the planar light-source uniformity provided by the light-source module 100 must be in consideration in the design of a smaller third interval T3. The width of the light exiting end SE in the second direction D2 is defined as a light exiting width HE. When the third interval T3 is insufficient, for example, the third interval T3 is less than the light exiting width HE, the light-beam L after exiting from the light-emitting assembly 126 is easier to be directly emitted from a position of the optical film 110 adjacent to the light exiting end SE so that a bright band is produced at the position near to the light exiting end SE. In this regard, the ratio of the third interval T3 over the light exiting width HE in the embodiment is adjusted to be over 1 but less than 10 to meet the thinning shape requirement on the light-source module by the market and reduce the bright band problem at the position near to the light exiting end SE.

In this way, the light-source module 100 of the embodiment is able to provide the uniform planar light-source meanwhile keeping a relatively thin overall thickness.

In the embodiment, the luminance distribution of the planar light-source provided by the light-source module 100 could be fine adjusted through disposing a plurality of consecutive concave-convex structures P on the reflective assembly 122. Specifically, each of the concave-convex structures P has a convex portion PU and a concave portion PD connecting the convex portion PU. These concave-convex structures P are connected to each other in pairs and consecutively distributed, so that the luminance distribution of the planar light-source provided by the light-source module 100 in the embodiment is more continuously and smoothly changed, i.e., the luminance difference between the adjacent convex portion PU and the concave portion PD is unlikely noticed. In comparison with the prior art where the inconsecutive concave-convex structures are disposed on the bottom surface of the LGP or the reflective surface of the direct-type light-source module is an inconsecutive concave-convex curve surface, the design of the consecutive concave-convex structures P in the embodiment could help the light-source module 100 to provide a planar light-source with better uniformity.

In the embodiment, a drop height H between the convex portion PU and the concave portion PD in the second direction D2 ranges, for example, between 0.3 mm and 10 mm, and the distance DP between the convex portion PU and the concave portion PD in the first direction D1 ranges, for example, between 3 mm and 15 mm. The consecutive concave-convex structures P in the embodiment, for example, are disposed on the second reflective portion 122b, which the invention is not limited to. In other embodiments, the consecutive concave-convex structures P could be disposed on both the first reflective portion 122a and the second reflective portion 122b.

The light-concentrating unit 124 in the embodiment is configured to transmit the light-beam L emitted from the light-emitting assembly 126 substantially towards the first direction D1, in which it is preferred the light-beam L is transmitted onto the whole surface of the reflective assembly 122 facing the optical film 110. Thus, the surface of the light-concentrating unit 124 facing the space C1 is preferably a specular reflective surface formed by, for example, adhering an enhanced specular reflector (ESR) or a silver reflector, or coating a reflective film, or a mixing of the above-mentioned processes, which the invention is not limited to.

The light-concentrating unit 124 includes an upper reflective portion 124a and a lower reflective portion 124b opposite to the upper reflective portion 124a, in which an end of the upper reflective portion 124a is adjacent to the optical film 110, an end of the lower reflective portion 124b is adjacent to the reflective assembly 122, and the other end of the upper reflective portion 124a and the other end of the lower reflective portion 124b are adjacent to the light-emitting assembly 126.

The above-mentioned light exiting width HE is the interval between the upper reflective portion 124a and the lower reflective portion 124b at the light exiting end SE. On the other hand, the width of the light incidence end SI in the second direction D2 is defined as a light incidence width HI, which in fact is the interval between the upper reflective portion 124a and the lower reflective portion 124b at the light incidence end SI. In addition, the length of the light-concentrating unit 124 in the first direction D1 is defined as a light-concentrating distance D124.

All the light incidence width HI, the light exiting width HE and the light-concentrating distance D124 affect the light exiting uniformity of the light-source module 100 and also decide whether or not producing a bright band at the position of the light-source module 100 adjacent to the light exiting end SE. Specifically, in addition to affecting the light exiting uniformity, the ratio of the light exiting width HE over the light-concentrating distance D124 also affects the overall visual perception of the light-source module 100. If the ratio of the light-concentrating distance D124 over the light exiting width HE is too small, the light-beam L after emitting from the light-emitting assembly 126 easily directly exits from the optical film 110 adjacent to the light exiting end SE so as to produce a bright band on the optical film 110 adjacent to the light exiting end SE. If the ratio of the light-concentrating distance D124 over the light exiting width HE is too large, i.e., the light-concentrating distance D124 is too long, the ineffective region BB at the bottom of the light-source module 100 is increased therewith. In consideration of the above-mentioned factors, the ratio of the light-concentrating distance D124 over the light exiting width HE in the embodiment is adjusted in the range over 0.5 but less than 10, so as to reduce the bright band problem at the position adjacent to the light-source in the prior art and to keep the visual artistic look of the light-source module 100. In this way, in comparison with the prior art where a shielding assembly is employed to shield the region producing the bright band so as to lead a smaller effective region, the embodiment does not need such kind of shielding assemblies in the light-source module 100 but obtains a relatively bigger effective region AA so that the overall luminance of the planar light-source provided by the light-source module 100 is advanced.

The size relation of the light incidence width HI and the light exiting width HE affects the converging of the light-beam L emitted from the light-concentrating unit 124 as well. If the light-beam L emitted from the light-concentrating unit 124 is too diffused, the light-beam L is easier to exit from the optical film 110 adjacent to the light-emitting assembly 126 to cause bright band problem. Therefore, in the embodiment, the light incidence width HI is less than the light exiting width HE to keep a better converging effect of the light-beam L emitted from the light-concentrating unit 124.

Both the upper reflective portion 124a and the lower reflective portion 124b in the embodiment are aspheric surfaces which could be adjusted to have more uniform luminance distribution depending on different size of the light-source module 100 and the different maximal interval (i.e. the third interval T3). Specifically, both the first section-line and the second section-line respectively corresponding to the upper reflective portion 124a and the lower reflective portion 124b and sectioned by a reference plane formed by the first direction D1 and the second direction D2 are aspheric curves. The first section-line and the second section-line herein could be symmetrical or asymmetrical to each other and are subject to a formula:

$$z = \frac{y^2/R}{1+\sqrt{1-(1+K)y^2/R^2}} + \sum_{n=2}^{10} A_{2n} y^{2n},$$

wherein z direction is the first direction, y direction is the second direction, K is spherical coefficients, R is curvature radiuses, $A_{2n}$ is the coefficient of $y^{2n}$, n is positive integers larger than or equal to 2 but less than 10.

In the embodiment, R is a non-zero constant. When the upper reflective portion 124a and the lower reflective portion 124b are symmetrical to each other, the first section-line and the second section-line have, for example, the same values of R, K and A4. For example, when K=−1, A4 is larger than or equal to 0.0001 and less than or equal to 0.1; or when K is −1.1 or −10 or between −1.1 and −10, A4 is 0 or is larger than or equal to 0.0001 and less than or equal to 0.1, which the invention is not limited to. When the upper reflective portion 124a and the lower reflective portion 124b are asymmetrical to each other (not shown in FIG. 1), at least one of R, K and A4 of the first section-line is different from for the same of the second section-line. For example, for the first section-line, K=−1.1 and A4=0, while for the second section-line, K=−1 and A4=0.001. In addition, the projection length in the first direction D1 of the upper reflective portion 124a could be the same as or different from the projection length in the first direction D1 of the lower reflective portion 124b. For example, the projection length in the first direction D1 of the upper reflective portion 124a could be 1.1-2 times of the projection length in the first direction D1 of the lower reflective portion 124b.

In the prior art, it mostly uses a parabolic surface (K=−1 and $A_{2n}$=0) to converge the light-beam and places the light-emitting assembly at the focus of the parabolic surface. Based on the premise of an ideal light-source (i.e., an infinitely small point source) serving as the light-emitting assembly, the light-beam reflected by the parabolic surface is parallel to the first direction D1. However, the light-emitting assembly in fact has a certain dimension and the light-beam reflected by the parabolic surface is substantially not a complete parallel light, which makes the parabolic surface unable to effectively reduce the bright band phenomena at the region adjacent to the light-source. On the other hand, if the light-beams reflected by the parabolic surface are collimated light-beams, the beams are distributed on a partial region of the reflective assembly only so as to cause light exiting uniformity problem easier.

Figure 2:
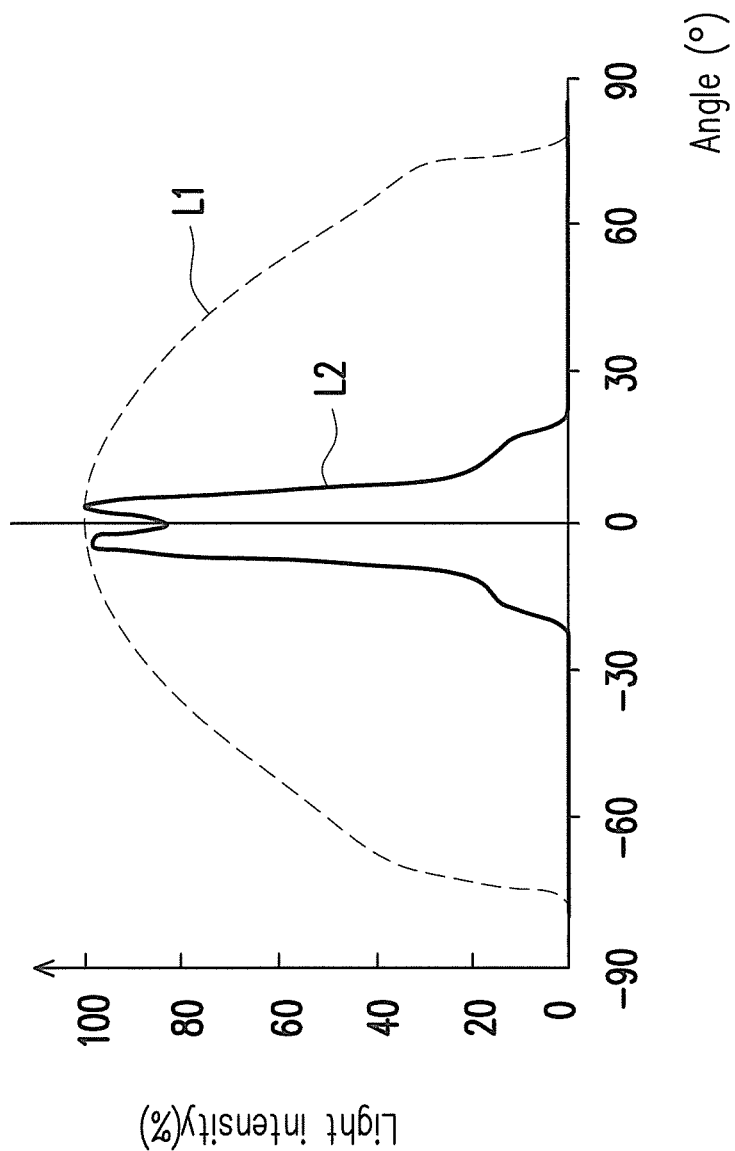
FIG. 2 is a diagram showing two light intensity-angle distributions respectively corresponding to a layout with a light-concentrating unit and a layout without light-concentrating unit.

To solve the above-mentioned problem, in the embodiment, the upper reflective portion 124a and the lower reflective portion 124b are designed as aspheric surfaces but not including the parabolic surfaces. Such design is helpful to reduce the bright band at the position of the light-source module 100 adjacent to the light exiting end SE of the light-concentrating unit 124 and could advance the light exiting uniformity of the light-source module 100. The following depiction is in accompanying with FIG. 2. FIG. 2 is a diagram showing two light intensity-angle distributions respectively corresponding to a layout with a light-concentrating unit and a layout without light-concentrating unit, wherein the abscissa represents the included angle between the light-beam L and the first direction D1 (as shown in FIG. 1), the positive value thereof means the light-beam L is emitted towards the upper reflective portion 124a and the negative value means the light-beam L is towards the lower reflective portion 124b. In addition, the light-source in the exemplary example of FIG. 2 is LEDs, and sections L1 and L2 respectively represent the measuring results without disposing and with disposing the light-concentrating unit 124.

It can be seen from FIG. 2 that by disposing the light-concentrating unit, the light-beam L has better converging effect (corresponding to a narrower angle distribution range of light intensity), and the maximal value of the light intensity occurs not at 0° (the light-beam parallel to the first direction D1), but roughly at positions of 5° and −3°. Referring to FIGS. 1 and 2, the light-beam L reflected by the upper reflective portion 124a of the light-concentrating unit 124 and the direction parallel to the optical film 110 (i.e., the first direction D1) has a first angle θ1, while the light-beam L reflected by the lower reflective portion 124b of the light-concentrating unit 124 and the direction parallel to the optical film 110 (i.e., the first direction D1) has a second angle θ2. In the embodiment, the first angle θ1 is, for example, over 0° and less than or equal to 5°, while the second angle θ2 is, for example, over 0° and less than or equal to 3°, The light-concentrating unit 124 is configured to converge the light-beam L, so that the light-concentrating unit 124 in the embodiment could effectively reduce the bright band problem at the region adjacent to the light-source and make the light-beam L diffused on the whole reflective assembly 122, which further advances the light exiting uniformity of the light-source module 100.

Continuing to FIG. 1, the side reflective unit 130 of the embodiment is configured to reflect the light-beam L to the reflective assembly 122, wherein when a third included angle θ3 between the side reflective unit 130 and the optical film 110 is larger, the light-beam L reflected by the side reflective unit 130 is more easily transmitted to the region of the second reflective portion 122b close to the side reflective unit 130. In the embodiment, the third angle θ3 is, for example, lower than 180° and greater than 90° and preferably is lower than or equal to 135° and greater than 90°. It should be noted that the side reflective unit 130 is not restricted to be a plane; in other embodiments, the side reflective unit 130 could be a curved surface, and the curved surface herein is, for example, a concave surface or a convex surface, or a continuous curved surface formed by a plurality of concave surfaces and convex surfaces smoothly connected to each other, which the invention is not limited to.

A portion of the light-beam L emitted from the light-emitting assembly 126 would be directly transmitted to the reflective assembly 122, diffused by the reflective assembly 122 and then emitted out from the optical film 110. The other portion of the light-beam L emitted from the light-emitting assembly 126 is transmitted to the upper reflective portion 124a and the lower reflective portion 124b of the light-concentrating unit 124 first, wherein the partial light-beam L reflected by the lower reflective portion 124b goes to the first reflective portion 122a and a region of the second reflective portion 122b adjacent to the first end S1, so that the light-beam L exits from the optical film 110 through the action of the reflective assembly 122; the partial light-beam L reflected by the upper reflective portion 124a is transmitted to the second reflective portion 122b and a region of the side reflective unit 130 and so on adjacent to the second end S2, then the side reflective unit 130 reflects the light-beam L to a region of the second reflective portion 122b adjacent to the second end S2 and finally exits from the optical film 110 through the action of the reflective assembly 122. In other words, the side reflective unit 130 could be seen as a virtual light-source for increasing the freedom of the luminance distribution to make the planar light-source provided by the light-source module 100 more uniform. In this regard, the preferred design of the surface of the side reflective unit 130 facing the space C1 is a specular reflective surface, formed by, for example, adhering an enhanced specular reflector (ESR) or a silver reflector, or coating a reflective film, or a mixing of the above-mentioned processes, which the invention is not limited to.

Figure 3:
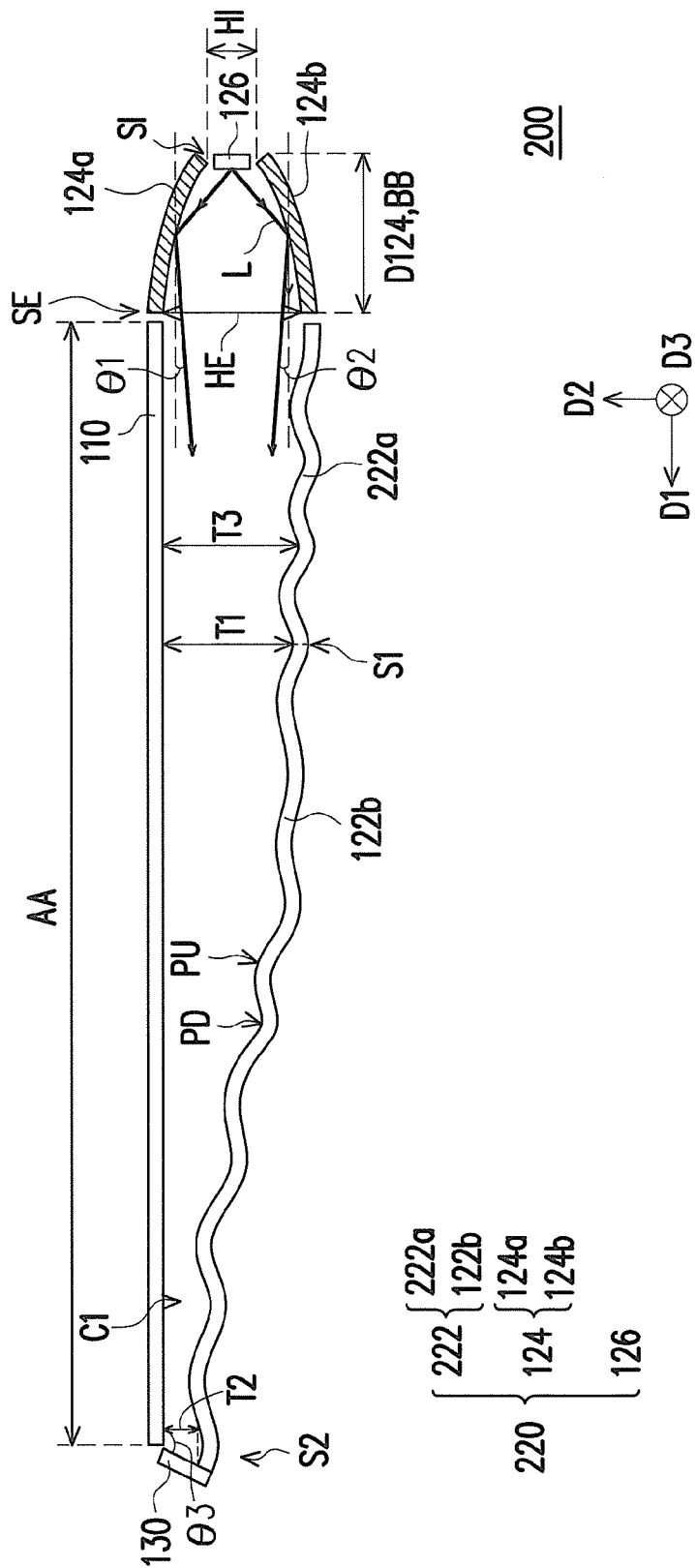
FIG. 3 is a cross-section diagram of a light-source module according to the second embodiment of the invention.

FIG. 3 is a cross-section diagram of a light-source module according to the second embodiment of the invention. Referring to FIG. 3, a light-source module 200 of the embodiment has similar parts and layout to the light-source module 100 in FIG. 1, wherein the same parts and layout are omitted to avoid duplicating depiction.

The major difference of the light-source module 200 of the embodiment from the light-source module 100 of FIG. 1 is the light-source module 200. A first reflective portion 222a of a reflective assembly 222 of a light-source unit 220 is substantially parallel to the optical film 110. The concave-convex structures P are disposed both on the first reflective portion 222a and the second reflective portion 122b, which the invention is not limited to. In fact the concave-convex structures P could be disposed on the second reflective portion 122b only.

Figure 4:
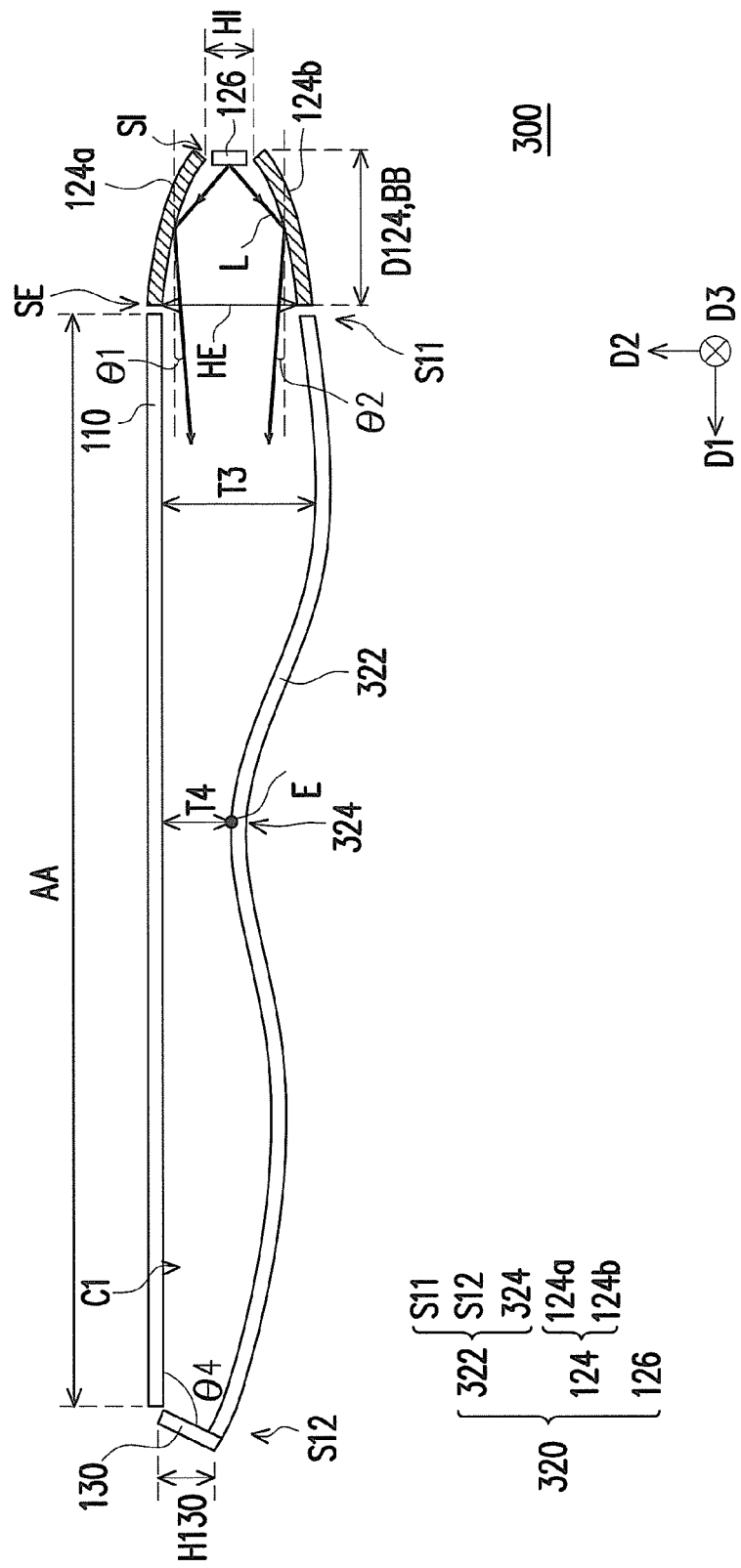
FIG. 4 is a cross-section diagram of a light-source module according to the third embodiment of the invention.

FIG. 4 is a cross-section diagram of a light-source module according to the third embodiment of the invention. Referring to FIG. 4, a light-source module 300 of the embodiment has similar parts and layout to the light-source module 100 in FIG. 1, wherein the same parts and layout are omitted to avoid duplicating depiction.

The light-source module 300 has a light-source unit 320, an optical film 110 and a side reflective unit 130, in which the reflective assembly 322 of the light-source unit 320 has a first connection end S11 and a second connection end S12 opposite to the first connection end S11. The light-concentrating unit 124 is adjacent to the optical film 110 and the first connection end S11, the first connection end S11 is located between the second connection end S12 and the light-concentrating unit 124 and the second connection end S12 is adjacent to the optical film 110. The major difference of the light-source module 300 of the embodiment from the light-source module 100 of FIG. 1 is that the reflective assembly 322 further has a protrusion portion 324 protruded towards the space C1, the protrusion portion 324 has a top-point E most close to the optical film 110 in the second direction D2, wherein a distance between the top-point E and the optical film 110 in the second direction D2 is defined as a fourth interval T4 and the fourth interval T4 is less than the third interval T3. In the embodiment, the fourth interval T4 is, for example, a half of the third interval T3, which the invention is not limited to.

A ratio of a projection length in the first direction D1 between the top-point E and the first connection end S11 over a projection length in the first direction D1 between the top-point E and the second connection end S12 is, for example, large than or equal to ⅐ and less than or equal to 7, the fourth interval T4 is less than the light exiting width HE and the fourth interval T4 is less than the projection length H130 in the second direction D2 of the side reflective unit 130 as well. In other words, the interval between the protrusion portion 324 of the reflective assembly 322 and the optical film 110 in the second direction D2 is less than the interval between the first connection end S11 and the optical film 110 and the interval between the second connection end S12 and the optical film 110 in the second direction D2. In the embodiment, the luminance distribution between the protrusion portion 324 and the second connection end S12 mainly depends on the value of a fourth angle θ4 between the side reflective unit 130 and the optical film 110. When the fourth angle θ4 is 90°, the side reflective unit 130 directly reflects the light-beam L come from the upper reflective portion 124a back to a place near the upper reflective portion 124a so that the dark band is easily produced between the protrusion portion 324 and the second connection end S12. In order to compensate the luminance between the protrusion portion 324 and the second connection end S12, the fourth angle θ4 is under 180° but greater than 90° by design, and preferably is less than or equal to 135° but greater than 90°.

The protrusion portion 324 in the embodiment is, for example, a continuous curved surface, which the invention is not limited to. The protrusion portion 324 could be also composed of a plurality of planes or curve surfaces with different curvatures depending on the actual need, or formed by mutual connecting the above-mentioned planes and curved surfaces. The above-mentioned concave-convex structures P could be optionally disposed in at least one of sections between the protrusion portion 324 of the reflective assembly 322 and the second connection end S12 and between the protrusion portion 324 and the first connection end S11 for fine adjusting the luminance distribution of the planar light-source provided by the light-source module 300, which the invention is not limited to.

Figure 5A:
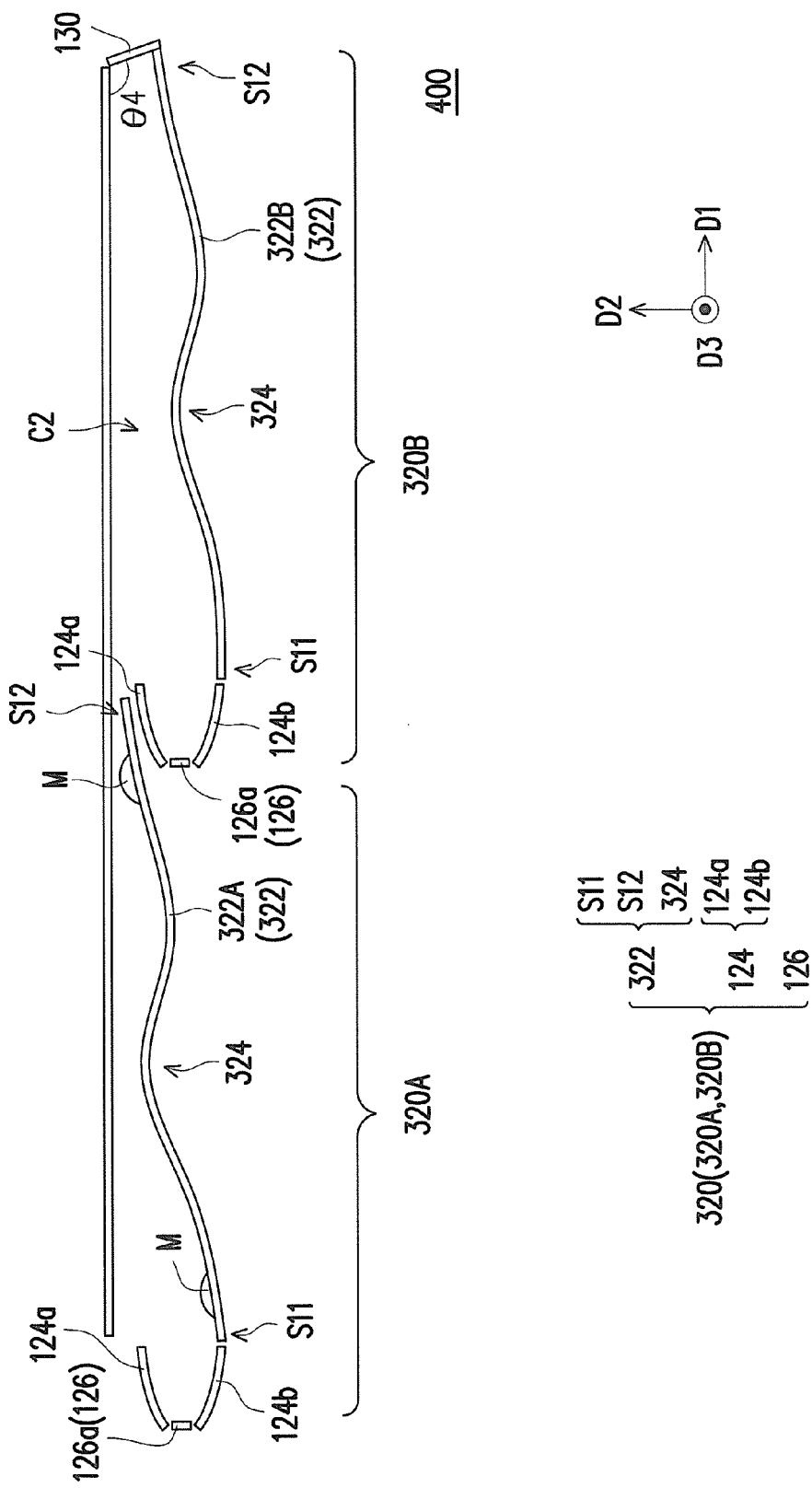
FIG. 5A is a cross-section diagram of a light-source module according to the fourth embodiment of the invention.

FIG. 5A is a cross-section diagram of a light-source module according to the fourth embodiment of the invention. Referring to FIG. 5A, a light-source module 400 of the embodiment has similar parts and layout to the light-source module 300 in FIG. 4, wherein the same parts and layout are omitted to avoid duplicating depiction.

Continuing to FIG. 5A, the major difference of the light-source module 400 of the embodiment from the light-source module 300 of FIG. 4 is that the light-source module 400 of the embodiment includes a plurality of light-source units 320 adjacently arranged in pairs, and the optical film 110 and the light-source units 320 together enclose a space C2. In the embodiment, the light-source units 320A and 320B are, for example, described, which the invention is not limited to. In the light-source module 400, the second connection end S12 of a light-source unit 320A among the two light-source units 320A and 320B adjacent to each other extends to a place between the optical film 110 and the light-concentrating unit 124 of the other light-source unit 320B, and the reflective assemblies 322A and 322B could be optionally disposed with the above-mentioned protrusion portion 324. The light-source module 400 could further dispose with the above-mentioned side reflective unit 130, for example, the side reflective unit 130 is disposed opposite to the light-concentrating unit 124 of the light-source unit 320B and connected to the optical film 110 and the second connection end S12 of the other light-source unit 320B. The side reflective unit 130, the optical film 110, the light-source units 320A and 320B are together enclosed the space C2.

Figure 5B:
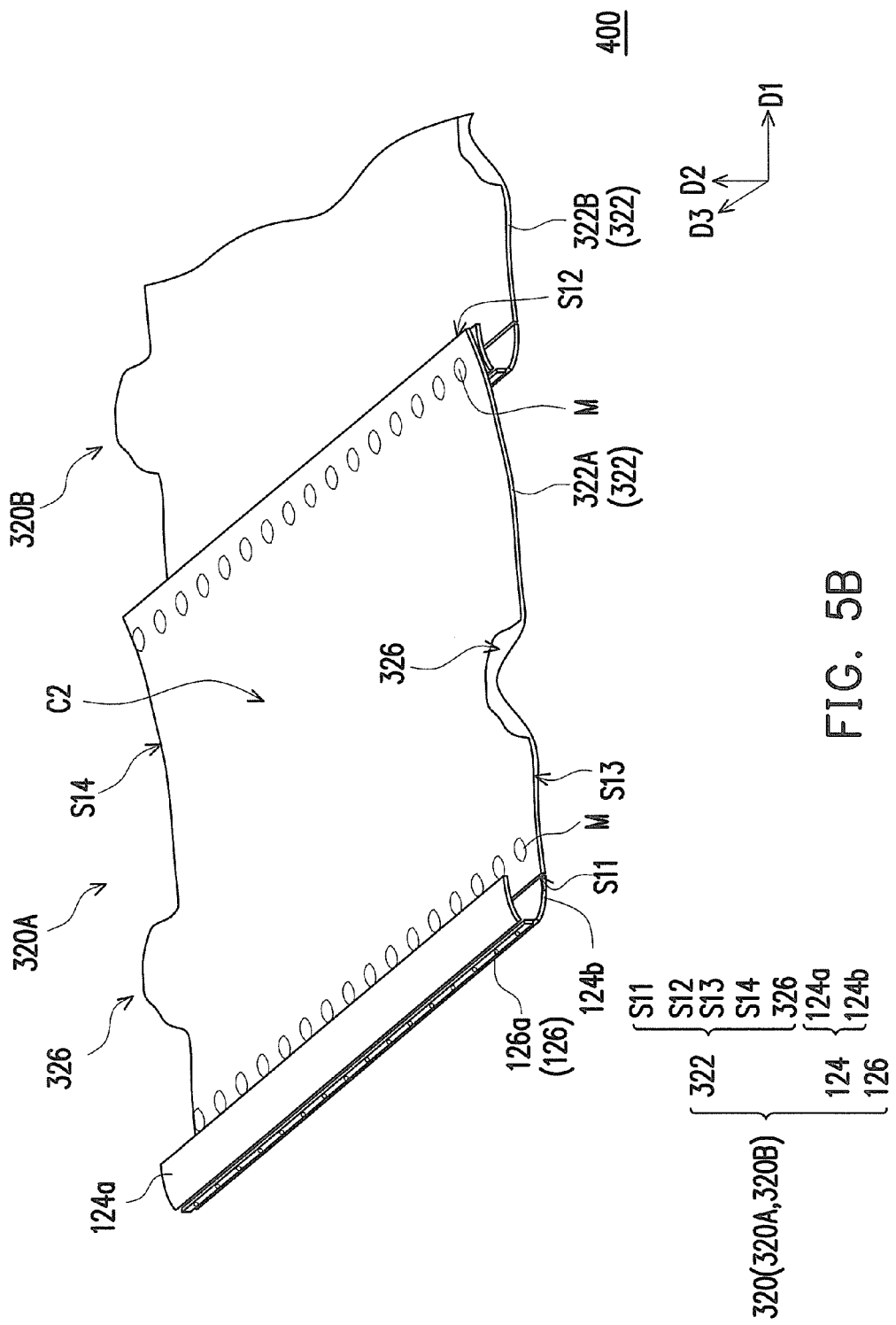
FIG. 5B is a partial side-view diagram of another light-source module according to the fourth embodiment of the invention.

FIG. 5B is a partial side-view diagram of another light-source module according to the fourth embodiment of the invention. To better show the light-source unit 320A, the optical film 110 in FIG. 5A is omitted in FIG. 5B. In the embodiment, each of the reflective assemblies 322 could omit the configuration of the protrusion portion 324 in FIG. 5A, which the invention is not limited to. A reflective assembly 322A among the reflective assemblies 322 in the embodiment is chosen as an example, the reflective assembly 322A further has a third connection end S13 and a fourth connection end S14. The fourth connection end S14 is opposite to the third connection end S13, the third connection end S13 is connected to the first connection end S11 and the second connection end S12, the fourth connection end S14 is connected to the first connection end S11 and the second connection end S12, and at least one of the third connection end S13 and the fourth connection end S14 has at least one warping portion 326. The warping portion 326 is bent, for example, towards the space C2, and the warping portion 326 is not connected to the first connection end S11 and the second connection end S12. In other words, the warping portions 326 in the embodiment are not disposed at the positions where the connection ends are connected to each other (i.e., the corner points of each the reflective assembly 322A). When the light-emitting assembly 126 is too far away from the frame (near to the third connection end S13 and the fourth connection end S14), the dark regions easily occur at the region of the light-source module 400 close to the third connection end S13 and the fourth connection end S14. At the time, by disposing the warping portions 326, the luminance of the dark regions could be compensated. In other embodiments of the invention, the warping portions 326 could be disposed at the reflective assembly 122 or the reflective assembly 222 so as to further advance the light exiting uniformity of the light-source module. The number, the bending extent and the bending range of the warping portions 326 depend on the actual need, which the invention is not limited to.

In the embodiment, the light-emitting assembly 126 could be formed by a plurality of point light-sources 126a, which are disposed at the positions adjacent to the first connection end S11 and arranged along the third direction D3. The point light-sources 126a are, for example, LEDs or point light-sources in other forms, which the invention is not limited to. In the embodiment, the reflective assembly 322A of the light-source unit 320A could further include a plurality of micro structures M arranged respectively along the first connection end S11 and the second connection end S12 so as to advance the light exiting uniformity of the light-source module 400, wherein the space between two adjacent micro structures M in the first direction D1 is corresponding to at least one of the point light-sources 126a. The dimension of each of the micro structures M could be the same as or different from each other, which the invention is not limited to. It should be noted that, in the embodiment, the reflective assembly 322B of the light-source unit 320B could or could not be disposed with the micro structures M. That is to say, the micro structures M are optionally employed depending on the actual need, which the invention is not limited to.

The design in the embodiment that the light-source units 320 are arranged adjacently to each other in pairs could slightly reduce the overall size of each of the light-source units 320A and 320B and thus the maximal interval (not shown) between each the reflective assembly 322 and the optical film 110 in the second direction D2 in the embodiment is reduced as well. As a result, the overall thickness of the light-source module 400 could be less than the overall thicknesses of the above-mentioned light-source modules 100, 200 and 300.

In summary, in the light-source module of the embodiments of the invention, the light-beam travels in the space enclosed by the light-source units and the optical film, thus the light-source module of the above-mentioned embodiments in the invention could omit the configuration of the LGP to achieve a thinner shape and a lower cost. In addition, the design that the ratio of the light-concentrating distance over the light exiting width is less than 10 could reduce the area of an ineffective region of the light-source module so as to increase the visual artistic look of the light-source module. By the design that the ratio of the light-concentrating distance over the light exiting width is greater than 0.5, the light-concentrating effect of the light-concentrating unit is enhanced so as to reduce the bright band problem occurring at the position adjacent to the light exiting end.

It will be apparent to those skilled in the art that the descriptions above are several preferred embodiments of the invention only, which does not limit the implementing range of the invention. Various modifications and simple equivalent variations made according to the claims and the specification of the invention still belong to the claimed range of the invention. In addition, any one of the embodiments or claims of the invention is not necessarily to achieve all of the above-mentioned objectives, advantages or features. The abstract of the disclosure is provided to comply with the rules requiring an abstract, which will allow a searcher to quickly ascertain the subject matter of the technical disclosure of any patent issued from this disclosure.

What is claimed is:

1. A light-source module, comprising an optical film and at least one light-source unit, wherein
   the at least one light-source unit and the optical film together enclose a space,
   the light-source unit comprises a reflective assembly, a light-concentrating unit and at least one light-emitting assembly,
   the reflective assembly disposed under the optical film, has a first connection end and a second connection end opposite to the first connection end, and in comparison with the first connection end, the second connection end is more close to the optical film,
   the light-concentrating unit has a light exiting end and a light incidence end opposite to the light exiting end, the light-concentrating unit is adjacent to the first connection end and the optical film, and the light exiting end faces the space,
   the at least one light-emitting assembly is disposed beside the light incidence end for providing a light-beam to enter the light-concentrating unit via the light incidence end and then enter the space via the light exiting end, wherein optical-axis direction of the light-emitting assembly is defined as a first direction and the direction perpendicular to both the first direction and the optical film is defined as a second direction, the length of the light-concentrating unit in the first direction is defined as a light-concentrating distance, width of the light exiting end in the second direction is defined as a light exiting width, and ratio of the light-concentrating distance over the light exiting width is greater than 0.5 but less than 10.

2. The light-source module as claimed in claim 1, wherein width of the light incidence end in the second direction is defined as a light incidence width, and the light incidence width is less than the light exiting width.

3. The light-source module as claimed in claim 1, wherein the reflective assembly comprises a first reflective portion and a second reflective portion, the first reflective portion is disposed between the light-concentrating unit and the second reflective portion, the second reflective portion has a first end and a second end opposite to the first end, the first end is connected to the first reflective portion, distance between the first end and the optical film in the second direction is defined as a first interval, distance between the second end and the optical film in the second direction is defined as a second interval, and the second interval is less than the first interval.

4. The light-source module as claimed in claim 3, wherein the first reflective portion is substantially parallel to the optical film.

5. The light-source module as claimed in claim 3, wherein distance between the first reflective portion and the optical film in the second direction is defined as a third interval, and ratio of the third interval over the light exiting width is greater than or equal to 1 but less than 10.

6. The light-source module as claimed in claim 1, wherein the reflective assembly has a plurality of consecutive concave-convex structures.

7. The light-source module as claimed in claim 6, wherein the reflective assembly comprises a first reflective portion and a second reflective portion, the first reflective portion is disposed between the light-concentrating unit and the second reflective portion, and the concave-convex structures are substantially located at the second reflective portion.

8. The light-source module as claimed in claim 6, wherein each of the concave-convex structures has a convex portion and a concave portion, drop heights of the convex portion and the concave portion in the second direction range between 0.3 mm and 10 mm, and distance between the convex portion and the concave portion in the first direction ranges between 3 mm and 15 mm.

9. The light-source module as claimed in claim 1, wherein the light-concentrating unit comprises an upper reflective portion and a lower reflective portion opposite to the upper reflective portion, and an end of the upper reflective portion is adjacent to the optical film, an end of the lower reflective portion is adjacent to the reflective assembly, and another end of the upper reflective portion and another end of the lower reflective portion are adjacent to the light-emitting assembly.

10. The light-source module as claimed in claim 9, wherein both a first section-line of the upper reflective portion and a second section-line of the lower reflective portion sectioned by a reference plane formed by the first direction and the second direction are aspheric surface curves, and the first section-line and the second section-line are subject to a formula:

$$z = \frac{y^2/R}{1+\sqrt{1-(1+K)y^2/R^2}} + \sum_{n=2}^{10} A_{2n} y^{2n},$$

wherein z direction is the first direction, y direction is the second direction, K is spherical coefficients, R is curvature radiuses, $A_{2n}$ is the coefficient of $y^{2n}$, n is positive integers larger than or equal to 2 but less than or equal to 10, and R is a non-zero constant.

11. The light-source module as claimed in claim 10, wherein K in the formula is −1 or −10 or between −1 and −10 and when K=−1, A4 is larger than or equal to 0.0001 and less than or equal to 0.1, while when K is −1.1 or −10 or between −1.1 and −10, A4 is larger than or equal to 0.0001 and less than or equal to 0.1.

12. The light-source module as claimed in claim 10, wherein when K in the formula is −1.1 or −10 or between −1.1 and −10, A4 is 0.

13. The light-source module as claimed in claim 10, wherein both the first section-line and the second section-line have the same values of R, K and A4.

14. The light-source module as claimed in claim 10, wherein at least one among the values of R, K and A4 of the first section-line is different from the same of the second section-line.

15. The light-source module as claimed in claim 9, wherein a projection length in the first direction of the upper reflective portion is 1.1-2 times of a projection length in the first direction of the lower reflective portion.

16. The light-source module as claimed in claim 1, further comprising a side reflective unit opposite to the light-concentrating unit for connecting the reflective assembly and the optical film, wherein the side reflective unit and the optical film and the light-source unit together enclose the space.

17. The light-source module as claimed in claim 16, wherein the side reflective unit has an included angle towards the optical film, and the angle is less than 180° but greater than 90°.

18. The light-source module as claimed in claim 17, wherein the angle is substantially less than or equal to 135° but greater than 90°.

19. The light-source module as claimed in claim 1, wherein the reflective assembly has a protrusion portion protruded towards the space.

20. The light-source module as claimed in claim 19, wherein the protrusion portion has a top-point most close to the optical film in the second direction, a distance between the top-point and the optical film in the second direction is defined as a fourth interval, and the fourth interval is less than the light exiting width.

21. The light-source module as claimed in claim 20, wherein ratio of a projection length between the top-point and the first connection end in the first direction over a projection length between the top-point and the second connection end in the first direction is larger than or equal to 1/7 and less than or equal to 7.

22. The light-source module as claimed in claim 1, wherein the optical film comprises at least one diffuser.

23. The light-source module as claimed in claim 1, wherein the reflective assembly has a third connection end and a fourth connection end, the fourth connection end is opposite to the third connection end, the third connection end is connected to the first connection end and the second connection end, the fourth connection end is connected to the first connection end and the second connection end, and at least one of the third connection end and the fourth connection end has at least one warping portion curved towards the space.

24. The light-source module as claimed in claim 23, wherein the connection places of the third connection end and the fourth connection ends do not have the warping portion.

25. The light-source module as claimed in claim 1, wherein the number of the light-source units is at least two, the light-source units are arranged adjacently to each other in pairs, wherein the second connection end of the at least one light-source unit extends to a place between the optical film and the light-concentrating unit of the other adjacent light-source unit.

26. The light-source module as claimed in claim 25, wherein the reflective assembly of the light-source unit has a plurality of micro structures arranged respectively along the first connection end and the second connection end, the light-emitting assembly comprises a plurality of point light-sources, and gaps between the micro structures are respectively corresponding to at least one point light-source in the first direction.

27. The light-source module as claimed in claim 1, wherein the light-emitting assembly comprises a plurality of point light-sources, the point light-sources are disposed along a third direction, and the third direction is substantially parallel to the light incidence end.

* * * * *